United States Patent
Young et al.

(10) Patent No.: US 7,243,028 B2
(45) Date of Patent: Jul. 10, 2007

(54) METHODS AND APPARATUS FOR REDUCING ELECTROMAGNETIC SIGNAL NOISE

(75) Inventors: Allen Young, Houston, TX (US); Michael Nero, Houston, TX (US); Laurence Barry, Alberta (CA); Hugh Hawthorne, Casper, WY (US); Robert Villarreal, Angleton, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 11/152,408

(22) Filed: Jun. 14, 2005

(65) Prior Publication Data

US 2006/0035591 A1    Feb. 16, 2006

Related U.S. Application Data

(60) Provisional application No. 60/579,328, filed on Jun. 14, 2004.

(51) Int. Cl.
*G01V 1/28* (2006.01)
*G01V 11/00* (2006.01)

(52) U.S. Cl. ......................... 702/9; 340/853.2
(58) Field of Classification Search ............... 702/7, 702/9; 340/853.2
See application file for complete search history.

(56) References Cited

U.S. PATENT DOCUMENTS

| | | | |
|---|---|---|---|
| 2,000,716 A | 5/1935 | Polk | |
| 2,096,279 A | 10/1937 | Karcher | |
| 2,151,525 A | 3/1939 | Pittman et al. | |
| 2,364,957 A | 12/1944 | Douglas | |
| 2,388,141 A | 10/1945 | Harrington | |
| 2,650,067 A | 8/1953 | Martin | |
| 2,917,704 A | 12/1959 | Arps | |
| 2,940,787 A | 6/1960 | Goodner | |
| 3,292,728 A * | 12/1966 | Ehrlich | ......................... 367/37 |
| 3,831,138 A | 8/1974 | Rammner | |
| 3,900,827 A | 8/1975 | Lemel et al. | |
| 3,905,010 A | 9/1975 | Fitzpatrick | |
| 4,015,234 A | 3/1977 | Krebs | |
| 4,160,970 A | 7/1979 | Nicolson | |
| 4,348,672 A | 9/1982 | Givler | |
| 4,494,072 A | 1/1985 | Jeter et al. | |
| 4,496,174 A | 1/1985 | McDonald et al. | |
| 4,578,675 A | 3/1986 | MacLeod | |
| 4,589,187 A | 5/1986 | Stone et al. | |

(Continued)

FOREIGN PATENT DOCUMENTS

CA    676449    12/1963

(Continued)

OTHER PUBLICATIONS

U.K. Search Report, GB0511852.6, dated Nov. 18, 2005.

(Continued)

*Primary Examiner*—D. McElheny, Jr.
(74) *Attorney, Agent, or Firm*—Patterson and Sheridan, LLP

(57) ABSTRACT

The present invention generally provides methods and apparatus for reducing noise in a detected electromagnetic wave used to telemeter data during a wellbore operation. In one embodiment, two surface antennae are placed on opposite sides of the wellbore and at the same distance from the wellbore. The signals from the two antennae are summed to reduce the noise in the electromagnetic signal transmitted from the electromagnetic downhole tool.

48 Claims, 5 Drawing Sheets

U.S. PATENT DOCUMENTS

| | | |
|---|---|---|
| 4,625,173 A | 11/1986 | Wisler et al. |
| 4,674,773 A | 6/1987 | Stone et al. |
| 4,691,203 A | 9/1987 | Rubin et al. |
| 4,736,204 A | 4/1988 | Davison |
| 4,786,086 A | 11/1988 | Guthrie et al. |
| 4,790,570 A | 12/1988 | De Gruijter |
| 4,800,385 A | 1/1989 | Yamazaki |
| 4,861,074 A | 8/1989 | Eastlund et al. |
| 4,927,186 A | 5/1990 | Zoboli |
| 4,980,682 A | 12/1990 | Klein et al. |
| 5,130,706 A | 7/1992 | Van Steenwyk |
| 5,138,313 A | 8/1992 | Barrington |
| 5,163,714 A | 11/1992 | Issenmann |
| 5,184,692 A | 2/1993 | Moriarty |
| 5,251,708 A | 10/1993 | Perry et al. |
| 5,278,550 A | 1/1994 | Rhein-Knudsen et al. |
| 5,303,773 A | 4/1994 | Czernichow et al. |
| 5,394,141 A | 2/1995 | Soulier |
| 5,396,232 A | 3/1995 | Mathieu et al. |
| 5,448,227 A | 9/1995 | Orban et al. |
| 5,725,061 A | 3/1998 | Van Steenwyk et al. |
| 5,749,605 A | 5/1998 | Hampton, III et al. |
| 5,924,499 A | 7/1999 | Birchak et al. |
| 6,050,353 A | 4/2000 | Logan et al. |
| 6,098,727 A | 8/2000 | Ringgenberg et al. |
| 6,158,532 A | 12/2000 | Logan et al. |
| 6,209,632 B1 | 4/2001 | Holbert et al. |
| 6,223,826 B1 | 5/2001 | Chau et al. |
| 6,223,862 B1 | 5/2001 | Barnes |
| 6,367,323 B1 | 4/2002 | Camwell et al. |
| 6,405,795 B2 | 6/2002 | Holbert et al. |
| 6,439,324 B1 | 8/2002 | Ringgenberg et al. |
| 6,556,054 B1 | 4/2003 | Goodman et al. |
| 6,572,152 B2 | 6/2003 | Dopf et al. |
| 6,672,383 B2 | 1/2004 | Holbert et al. |
| 6,801,136 B1 | 10/2004 | Goodman et al. |
| 2002/0189803 A1 | 12/2002 | Holbert et al. |
| 2004/0069514 A1 | 4/2004 | Rodney et al. |
| 2004/0134652 A1 | 7/2004 | Holbert |

FOREIGN PATENT DOCUMENTS

| | | |
|---|---|---|
| CA | 1217237 | 1/1987 |
| CA | 1277027 | 11/1990 |
| CA | 1323691 | 10/1993 |
| CA | 2151525 | 6/1995 |
| FR | 2174955 | 10/1973 |
| FR | 2618912 | 2/1989 |
| GB | 1359445 | 7/1974 |
| WO | WO 82/02754 | 8/1982 |
| WO | WO 96/41931 | 12/1996 |
| WO | WO 00/13349 | 3/2000 |

OTHER PUBLICATIONS

CA Examination Report, Application No.: 2,509,819, dated Feb. 12, 2007.

* cited by examiner

METHODS AND APPARATUS FOR REDUCING ELECTROMAGNETIC SIGNAL NOISE

CROSS-REFERENCE TO RELATED APPLICATIONS

This application claims benefit of co-pending U.S. Provisional Patent Application Ser. No. 60/579,328, filed on Jun. 14, 2004, which application is herein incorporated by reference in its entirety.

BACKGROUND OF THE INVENTION

1. Field of the Invention

Embodiments of the present invention generally relate to wireless data transmission systems. Particularly, the present invention relates to methods for increasing the reliability of detected electromagnetic waves. More particularly, the present invention relates to methods for reducing noise in a detected electromagnetic wave used to telemeter data from a drilling operation.

2. Description of the Related Art

Many operations in the drilling, evaluation, completion, and producing of oil and gas wells require communication between the surface of the earth and various devices located within the well borehole.

During the drilling operation, various formation and drilling parameters including, among others, the weight on the drill bit, downhole pressure, and borehole directional orientation, are commonly monitored. It is known to include instruments in the drill string to measure these various earth formation properties as the drill bit penetrates the formation. This is commonly referred to as logging-while-drilling ("LWD") or measurement-while-drilling ("MWD"). In addition to making measurements, these processes also involve the transmission of the measured parameters to the earth's surface.

A variety of data transmission systems have been used to transmit data between downhole and surface equipment. Probably the most common data transmission system is a "hard wire" or wireline system using conductor electrical cable, coaxial cable, or fiber optic cable. Generally, a wireline system includes a measuring instrument or "tool" conveyed along a borehole using a cable made of a single electrical conductor, multiple electrical conductors, one or more fiber optic conductors, or combinations thereof. The cable also functions as a means for communicating between the downhole tool and equipment at the surface. Data transmission rates can be very high using the hard wire transmission system. However, wireline systems, in general, can not be used during drilling operations. Therefore, wireline logs are typically run after a well has been drilled, or at intermediate steps in the drilling of the well with the drill string removed from the borehole. Other disadvantages of the wireline system include damage to the cable due to exposure in the wellbore, reduction of operating clearances for other operations, and complication of the tubular connection process.

Wireless systems for transmitting data have been developed to overcome the problems encountered with the wireline system. One example of the wireless system is the "mud pulse" system, which utilizes the drilling fluid as the transmission medium. As the drilling fluid is circulate in the wellbore, the flow of the drilling fluid is repeatedly interrupted to generate a varying pressure wave in the drilling fluid as a function of the downhole measured data. A drawback of the mud pulse systems is that the data transmission rates are very slow. Transmission rates are limited by poor pulse resolution as pressure pulsed attenuates along the borehole and by the velocity of sound within the drilling mud.

Another wireless data transmission system used in the industry is an electromagnetic ("EM") telemetry system. FIG. 1 shows a conventional EM telemetry system used in a drilling operation. The drill string 10 is separated into two portions by an insulating gap ring 32. The lower portion of the drill string 10 may include a drill bit 20, EM transmitter 35, and other instruments such as a MWD tool 30. Drilling and geological data acquired by the MWD tool 30 is relayed to the transmitter 35, which broadcasts the data in the form of a low frequency EM wave 15. Specifically, voltage applied between the upper and lower portions of the drill string 10 generates the EM wave 15 that propagates outward and upward towards the surface 3. The EM wave 15 travels through the earth to the surface 3 where a receiver 70 may measure the potential difference between a receiver 60 located proximate the blow out preventer 25 and an antenna 50 located at a predetermined distance away from the blow out preventer 25.

Date transmission via an EM telemetry system relies on the accurate detection of weak electrical signals by the receivers located at the surface. As such, stray surface noises or other ambient noises may interfere with the accuracy of the detected signals. For example, the rig 5 itself may produce noises having a frequency of 60 Hz. Thus, data extracted from the EM signal using the EM system in FIG. 1 may be compromised by the rig noise. However, because rig noise frequency is typically higher than the EM wave, this noise may be easily removed by using notch filters.

Another source of noise arises during drilling. Drill pipes are often inspected before deployment. Part of the inspection process may require the drill pipe to be magnetized. It is believed that electrical induction from rotation of magnetized drill pipe adjacent the BOP may produce a low frequency noise. Unlike rig noise, drill pipe noise may fall within the same frequency band as the EM signal, thereby making noise rejection more difficult.

There is a need, therefore, for a method for reducing the signal noise in a detected EM wave used to telemeter data during wellbore operations. There is also a need for a method for increasing the accuracy of telemetering data in real time between the surface and a downhole equipment.

SUMMARY OF THE INVENTION

Methods and apparatus are provided for reducing noise in a detected electromagnetic wave used to telemeter data during a wellbore operation. In one embodiment, two surface antennae are placed on opposite sides of the wellbore and at the same distance from the wellbore. The signals from the two antennae are summed to remove the noise in the electromagnetic signal transmitted from the electromagnetic downhole tool.

In another embodiment, a receiver is positioned in the vicinity of a rotating tubular to detect the time-varying magnetic field from the rotating tubular. The amplitude and/or the phase of the measured signal are adjusted to null synchronized noise in the electromagnetic wave detected by one or more surface electromagnetic receivers.

In another embodiment still, a method for reducing noise in a telemetry system includes measuring a first signal from a first location away from a wellbore and measuring a second signal from a second location away from the wellbore, wherein the first location and the second location are substantially the same distance from the wellbore and at opposite sides of the wellbore. Thereafter, the first signal and second signal are summed. In another embodiment, the method also includes measuring a third signal from a third location proximate the wellbore and calculating a potential difference between the third signal and the summed first and second signals. Preferably, the telemetry system transmits information in the form of an electromagnetic wave.

In another embodiment still, a telemetry system for wireless communication of data from a sensor in a wellbore comprises a transmitter disposed proximate the sensor for transmitting the data; a first receiver located at a distance away from the wellbore; and a second receiver located at substantially the same distance from the wellbore and on an opposite side of the wellbore. In another embodiment, the telemetry system also includes a third receiver located adjacent the wellbore. Preferably, the first receiver and the second receiver are adapted to detect an electromagnetic wave. In another embodiment, the telemetry system further comprises an electronic circuit adapted to remove electromagnetic noise. In another embodiment still, the first and second receivers comprise a surface antenna at least partially disposed in the earth.

In another embodiment still, a method for transmitting data during wellbore operations comprises detecting a first signal from a first receiver located proximate a wellbore. The method also includes positioning a second receiver and a third receiver at selected locations relative to the first receiver. In another embodiment, the second and third receivers are positioned about 180 degrees apart from each other with respect to the wellbore and detecting an electromagnetic wave. Thereafter, the method includes summing a second signal from the second receiver with a third signal from the third receiver. In another embodiment, the method further includes removing an electromagnetic noise from the electromagnetic wave.

In another embodiment still, a method of reducing electromagnetic noise from a rotating tubular disposed in a wellbore comprises detecting an electromagnetic wave using a surface receiver and measuring a magnetic signal of the rotating tubular. Thereafter, the method involves adjusting the measured magnetic signal to reduce the electromagnetic noise in the electromagnetic wave. In one embodiment, the method further includes detecting the electromagnetic wave using a second receiver and determining a potential difference between signals from the surface receiver and the second receiver. In another embodiment, the method includes adjusting an amplitude of the measured magnetic signal and/or adjusting a phase of the measured magnetic signal.

In another embodiment still, a telemetry system is provided for reducing noise from a rotating tubular during communication of data from a sensor located in a wellbore. The telemetry system includes a transmitter disposed proximate the sensor for transmitting the data; a first receiver located at a distance away from the wellbore; a second receiver located near the wellbore; and a third receiver adapted to detect a magnetic signal generated from a rotating tubular. In another embodiment, the telemetry system further includes a phase processor for adjusting a phase of the detected magnetic signal and/or an amplitude processor for adjusting an amplitude of the detected magnetic signal. In another embodiment, the first receiver and the second receiver are adapted to detect an electromagnetic wave.

In another embodiment still, a method of reducing noise during communication of data from a sensor located in a wellbore comprises transmitting data from the sensor; measuring a first signal from a first location; measuring a second signal from a second location; and measuring a third signal from a third location proximate the wellbore. The method further comprises summing at least two of the first signal, second signal, and third signal and reducing the noise in the transmitted data. In another embodiment, the third signal comprises a magnetic signal.

In another embodiment still, a method of forming a wellbore comprises providing a drill string having a drill bit; rotating the drill bit to form the wellbore; measuring a parameter associated with drilling; and transmitting the measured parameter in the form of an electromagnetic wave. The method also includes measuring a first signal proximate the wellbore; measuring a plurality of signals away from the wellbore; summing two or more of the measured signals; reducing a noise in the electromagnetic wave; and extending the wellbore in response to the measured parameters.

In another embodiment still, a method for reducing noise in a telemetry system comprises measuring a first signal from a first location away from a wellbore; measuring a second signal from a second location away from the wellbore; reconciling the first signal with the second signal. Thereafter, the first signal and the second signal are summed to determine a noise signal.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention generally provides methods and apparatus for reducing noise in a detected electromagnetic wave used to telemeter data during a wellbore operation. In one embodiment, two surface antennae are placed on opposite sides of the wellbore and the same distance from the wellbore. The signals from the two antennae are summed to remove the noise from the signal transmitted from the EM downhole tool.

Figure 2:
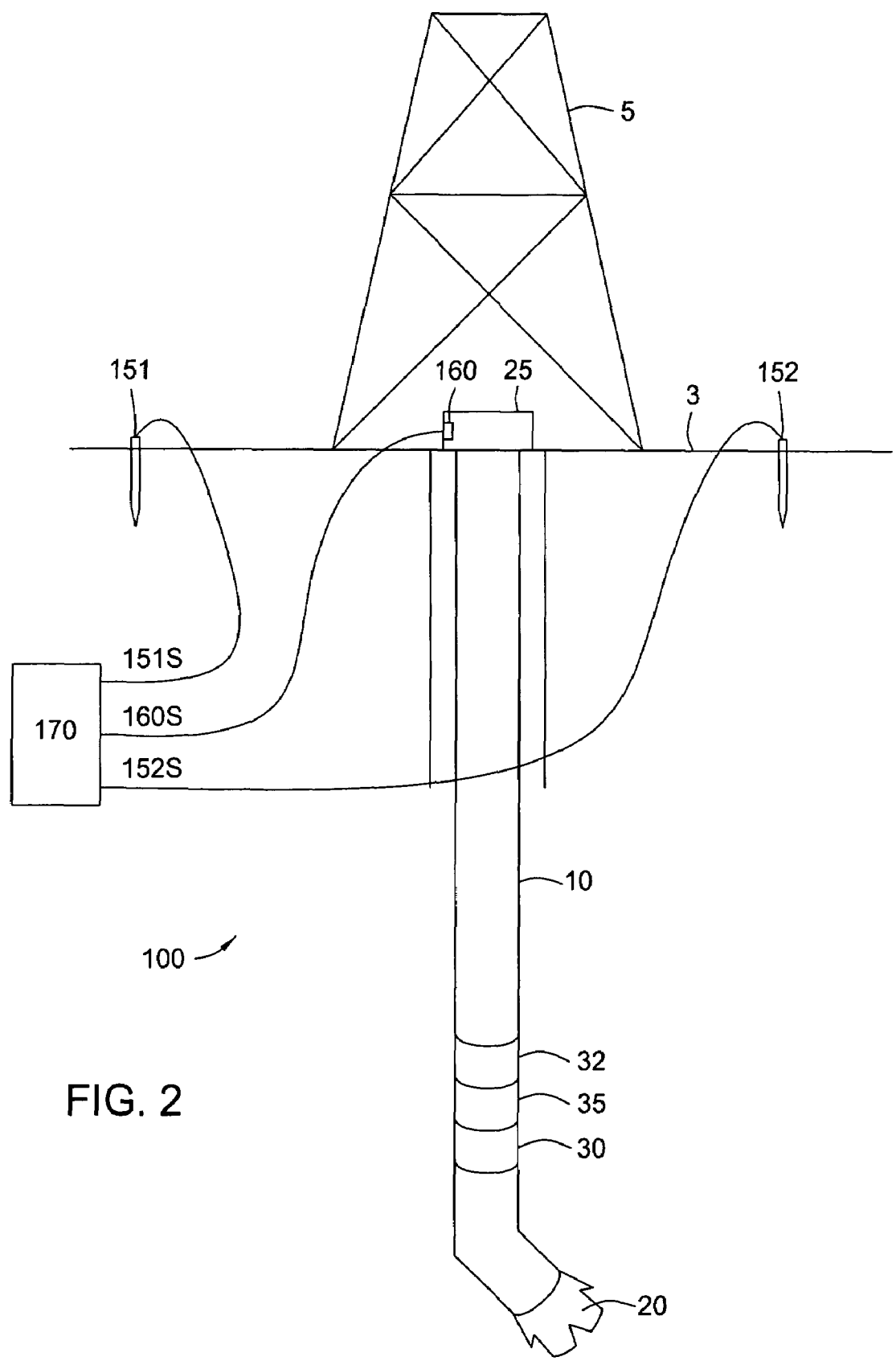
FIG. 2 shows an embodiment of an EM telemetry system according to aspects of the present invention.

FIG. 2 illustrates an exemplary telemetry system 100 according to aspects of the present invention. The telemetry system 100 is employed to transmit data acquired during a drilling operation. In FIG. 2, a drill string 10 is shown with a drill bit 20 disposed at a lower end. The drill string 10 extends from a blow out preventer ("BOP") 25 located at the surface 3. A rig 5 is positioned over the BOP 25 for raising and lowering the drill string 10. Although a drilling operation is shown, it is contemplated that aspects of the present invention are applicable to reduce signal noise for data telemetry systems used in a variety of wellbore operations.

A MWD tool 30 is disposed on the drill string 10 near the drill bit 20 to collect formation and drilling data. In this respect, the MWD tool 30 may include one or more sensors for measuring data and other electronic devices to process the signals generated by the sensors into a suitable signal for communication to the EM transmitter 35. For example, sensor signals are generally converted to digital data before electromagnetic transmission. Suitable electronic devices installed on the MWD tool 30 include A/D converters, modulator, memory, an on/off control, amplifiers, programmable logic controller, and circuitry for interfacing the various electronic devices. The MWD tool 30 may also include a battery pack to provide power to the electronic devices. Examples of MWD are taught in U.S. Pat. No. 6,364,037 which is herein incorporated by reference in its entirety.

Signals from the MWD tool 30 is fed into the EM transmitters 35 for transmission to the surface. The EM wave is generated by an EM telemetry system comprising a gap subassembly 32 disposed between two sections of the drill string 10. The gap subassembly 32, which contains an external non-conductive portion with composite coatings, insulates the two sections of the drill string 10, thereby forming a large antenna. Voltage applied between the two sections of this antenna creates the EM waves that carry the data to the surface. Specifically, the two sections of the antenna are energized with opposite electrical polarity, often using a modulated carrier wave that contains digital information which results in the EM wave. The EM wave may be any form of electromagnetic radiation such as radio waves, gamma rays, or x-rays. Other suitable EM telemetry system known in the art may also be used to generate the EM waves. Additionally, the EM transmitter may be integrated with the MWD tool 30.

EM waves reaching the surface are received by a receiver 160 located proximate the BOP 25 and two surface antennae 151, 152 installed at a predetermined distance from the BOP 25. Any suitable receiver and antennae capable of detecting the EM wave may be used as is known in the art. For example, the antennae 151, 152 may comprise a metal rod such as a stainless steel rod that penetrates a short distance into the ground. The surface antennae 151, 152 are adapted to detect the EM wave in the form of a voltage, whereby a current is induced and thereafter transmitted to an electronic box 170 for processing. The electronic box 170 includes an electronic circuit for performing the necessary processes to extract the formation and drilling data. For example, the electronic box 170 may amplify the signals to reconstruct the original waveform, compensating for losses and distortion occurring during the transmission of the EM wave through the earth. In this respect, the electronic box 170 may include the requisite electronic devices to perform the desired signal processing.

In one embodiment, the two surface antennae 151, 152 are installed on opposite sides of the BOP 25, or 180 degrees apart, and equidistant from the BOP 25. As shown in FIG. 2, one antenna 151 is disposed 100 m to the left of the BOP 25, while the other antenna 152 is disposed 100 m to the right of the BOP 25. Preferably, the two antennae 151, 152 are located on substantially equally consolidated soil. It is believed that if noise is induced by the permanent magnetic flux leaking from the rotating drill pipe 10, then the electrical phase would be 180 degrees out of phase on opposite sides of the well. By summing the two surface antenna signals 151S, 152S the EM signals from the EM transmitter 35 downhole should sum, while the opposite phase noise signals from the drill pipe noise or other noise should cancel, as represented by the equation below.

$$\text{Sum of Signals} = \begin{matrix}\text{Signal from antenna } 151 + \\ \text{Signal from antenna } 152\end{matrix}$$
$$= (Vs - Vn) + (Vs + Vn)$$
$$= 2Vs$$
where, $Vs$ = voltage from source
$Vn$ = voltage from noise It is contemplated that summation of signals includes summing at least a portion of each of the selected surface antennae signals.

After determining the source voltage, the noise voltage may be calculated. It is recognized that, in most instances, the calculated noise is only a fractional amount of the true noise that is contained in the source.

$Vn = \alpha Vtn$, where $Vtn$ is the true noise

Nevertheless, use of the method above will, at the very least, attenuate the noise, thereby increasing the signal to noise ratio ("SNR") and improving the accuracy of the data extracted, as shown in the following equation:

$$SNR = Vs/(Vtn - \alpha Vtn)$$

Figure 3:
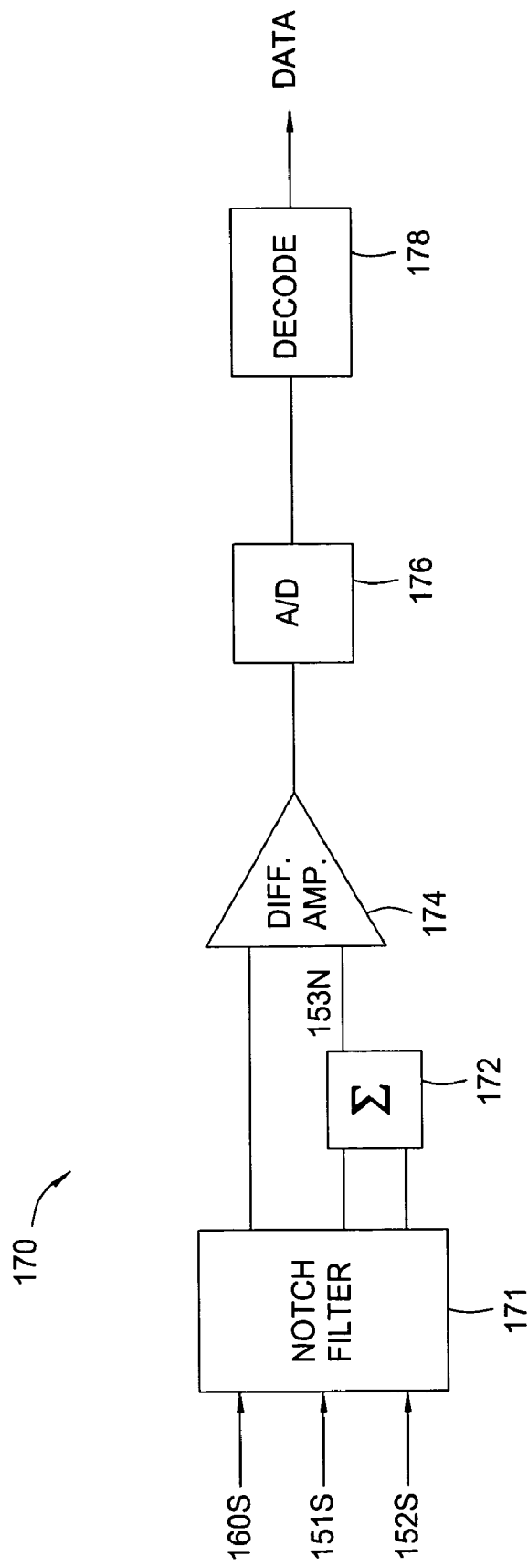
FIG. 3 is a flow chart for processing EM signals received by the EM telemetry system of FIG. 2.

FIG. 3 is an exemplary signal processing flow chart performed by the electronic box 170 after receiving the signals 151S, 152S, 160S from the receiver 160 and the surface antennae 151, 152. Initially, the signals 151S, 152S, 160S are passed through a notch filter 171 to remove noise at a predetermined frequency, such as the 60 hertz rig noise. Thereafter, the signals 151S, 152S from the antennae 151, 152 are summed by the summer 172 to determine the calculated noise ("αVn"). The calculated noise signal 153N and the receiver signal 160S are then passed through a differential amplifier 174, where the potential difference between the two signals 153N, 160S are calculated and amplified to a predetermined voltage. The potential difference is fed through analog digital converter 176 followed by a decoder 178, where it may be decoded to recreate a signal having the original frequency. In this manner, electromagnetic noise from drill pipe rotation may be reduced.

It should be noted that the two surface antennae 151, 152 may be placed at various orientations relative to each other so long as the measured signals 151S, 152S may be reconciled to cancel out the noise signal. For example, the first antenna 151 may be placed at 100 m apart from the BOP 25, while the second antenna 152 is placed at 50 m apart from the BOP 25 and 90 degrees from the first antenna 151. The measured signals 151S, 152S from the antennae 151, 152 may be reconciled in a manner known to a person of ordinary skill to derive two opposite phase signals. In one embodiment, the second signal 152S is reconciled to adjust the angular disparity and the distance disparity, thereby resulting in an equivalent signal measured at 100 m apart from the BOP 25 and 180 degrees from the first antenna 151. The equivalent signal would then be 180 degrees out of phase relative to the first signal 151S. Thereafter, the first signal 151S and the equivalent second signal 152S may be summed to cancel out the noise signal as described above.

It must be noted that more than two signals may be summed and that any or all of the signals may be reconciled.

Figure 1:
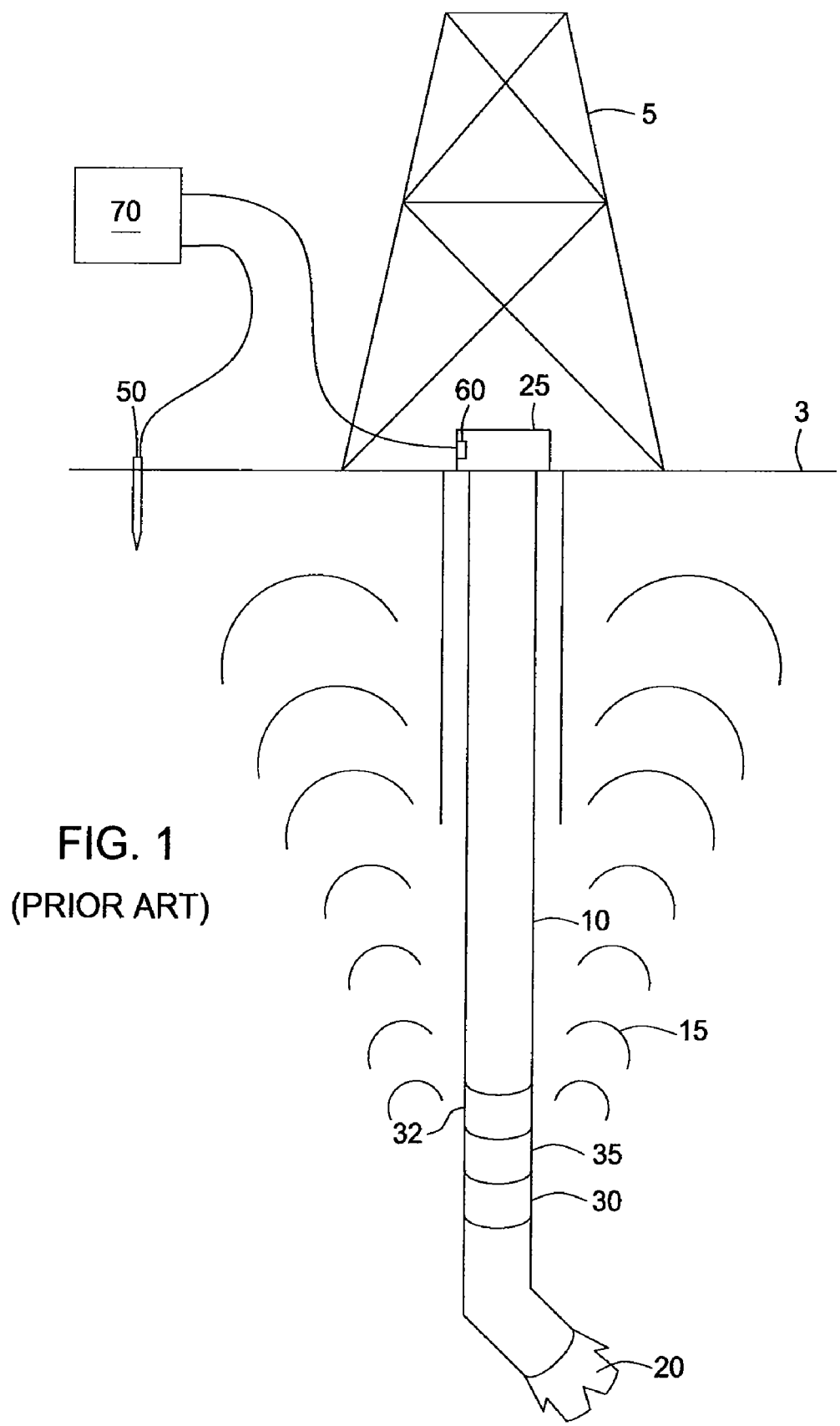
FIG. 1 shows a conventional EM telemetry system used in a drilling operation.
Figure 4:
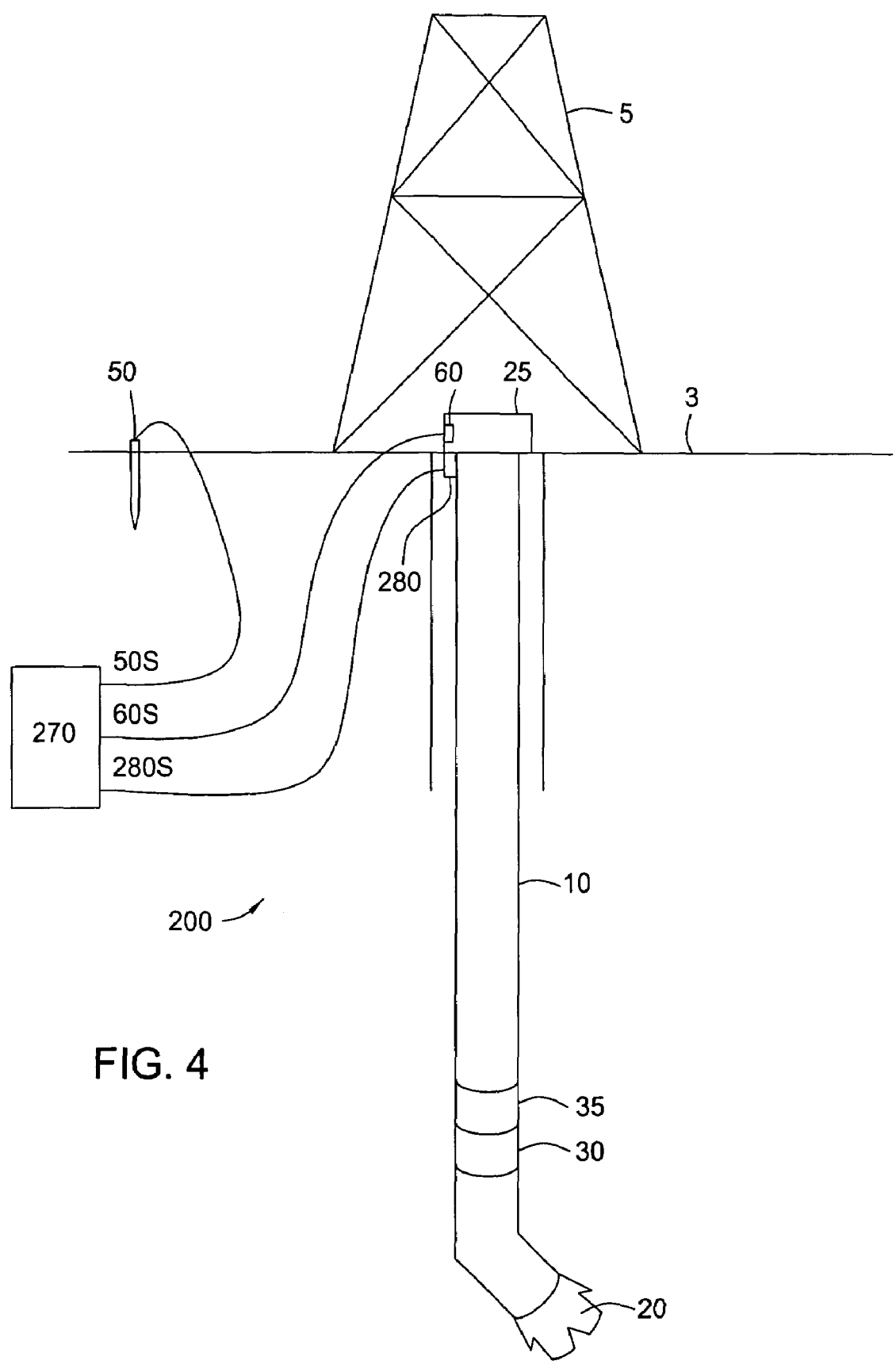
FIG. 4 shows another embodiment of an EM telemetry system according to aspects of the present invention.

FIG. 4 illustrates another method for reducing drill pipe noise. Components shown in FIG. 4 that are substantially similar to components shown in FIG. 1 are labeled with like numbers. Particularly, the drill string 10 is rotated to urge the drill bit 20 into the earth. A rig 5 is used to raise or lower the drill string 10. A MWD tool 30 and transmitter 35 is positioned near the drill bit 20 to collect geological and drilling data. Data acquired by the MWD tool 30 is relayed to the transmitter 35 and broadcasted in the form of a low frequency EM wave 15. The EM wave 15 travels through the earth to the surface 3 and is detected by the receiver 60 near the blow out preventer 25 and the surface antenna 50. Additional antennae may also be provided, for example, as shown in FIG. 2.

In one embodiment, a coil type pickup device 280 is placed in the vicinity of the rotating drill pipe 10. The pickup device 280 is adapted to detect the time varying magnetic field from the rotating drill pipe 10. An exemplary pickup device 280 is a coil type pick up device as is known to a person of ordinary skill in the art. Signals from the pickup device 280, the receiver 60, and the surface antenna 50 are communicated to an electronic box 270 for processing. It is believed that the frequency of the signal measured by the pickup device 280 is related to the frequency of the EM noise. In this respect, the measured signal may be amplitude and/or phase adjusted to null synchronized noise detected by the surface EM receiver 60 and the surface antenna 50. Preferably, the nulling process is performed with the EM transmitter 35 turned off.

Figure 5:
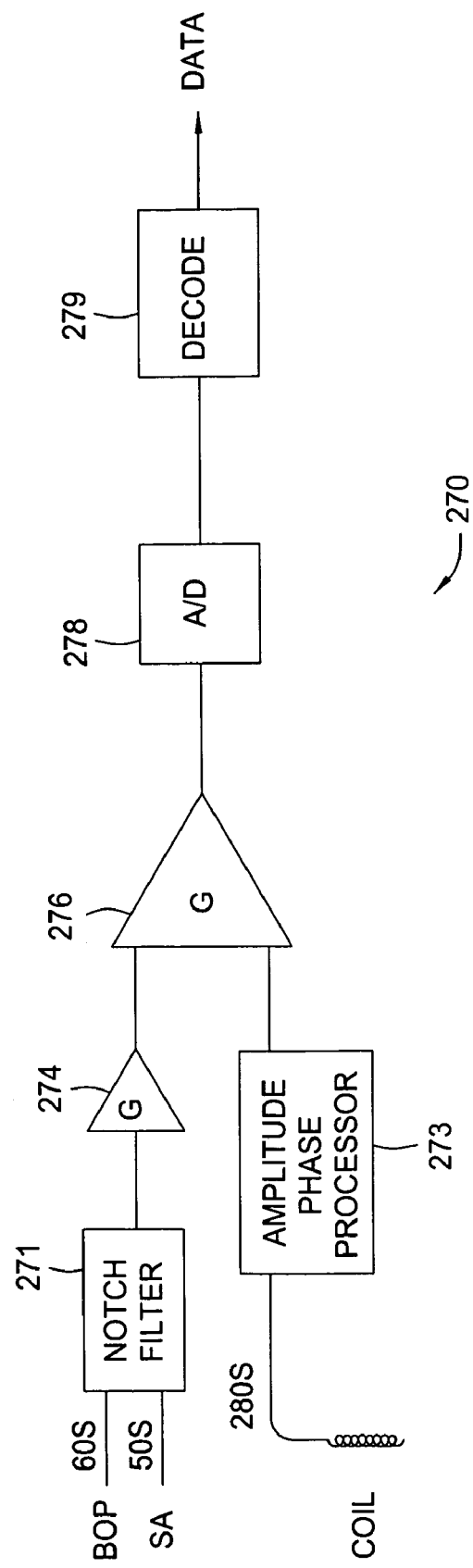
FIG. 5 shows a flow chart for processing EM signals received by the EM telemetry system of FIG. 4.

FIG. 5 is an exemplary signal processing flow chart performed by the electronic box 270 after receiving signals 60S, 50S, 280S from the receiver 60, surface antenna 50, and the pickup device 280. Initially, the signals 60S, 50S from the receiver 60 and the surface antenna 50 are passed through the notch filter 271 to remove noise at a predetermined frequency. Thereafter, the two signals 60S, 50S are passed through a differential amplifier 274, where the potential difference is determined and amplified. The coil pickup signal 280S is initially processed by the amplitude and phase processor 273 to adjust its amplitude and/or the phase such that it will null synchronized noise detected by the surface EM receivers 50, 60 when combined with the potential difference of the surface signals 60S, 50S. Preferably, the nulling process is performed with the EM transmitter 35 turned off. After the noise has been nulled, the remaining signal is fed through an analog digital converter 278 followed by a decoder 29, where it is decoded to recreate a signal having the original frequency.

While the foregoing is directed to embodiments of the present invention, other and further embodiments of the invention may be devised without departing from the basic scope thereof, and the scope thereof is determined by the claims that follow.

We claim:

1. A method of reducing an electromagnetic noise component from a rotating tubular disposed in a wellbore, comprising:
    transmitting an electromagnetic wave signal from a transmitter in the wellbore;
    detecting the electromagnetic wave signal using a surface receiver;
    detecting the electromagnetic wave signal using a surface antennae at a location away from the receiver;
    measuring a magnetic signal of the rotating tubular;
    filtering a known noise frequency from the electromagnetic wave signals detected by the receiver and the antennae;
    differentiating the electromagnetic wave signals detected by the receiver and the antennae using a differential amplifier to determine a synchronized noise signal; and
    adjusting the measured magnetic signal using a processor to reduce the electromagnetic noise component in the synchronized noise signal.

2. The method of claim 1, wherein adjusting the measured magnetic signal comprises adjusting an amplitude of the measured magnetic signal.

3. The method of claim 2, further comprising adjusting a phase of the measured magnetic signal.

4. The method of claim 1, wherein adjusting the measured magnetic signal comprising adjusting a phase of the measured magnetic signal.

5. A telemetry system for reducing a noise signal from a rotating tubular during communication of data from a sensor located in a wellbore, comprising:
    a data transmitter disposed proximate the sensor for transmitting the data;
    a first receiver located at a distance away from the wellbore configured to receive the data from the transmitter;
    a second receiver located near the wellbore configured to receive the data from the transmitter;
    a third receiver adapted to detect a magnetic signal generated from the rotating tubular;
    a phase processor adapted to adjust a phase of the magnetic signal; and
    an amplitude processor adapted to combine the phase adjusted magnetic signal with data from the first and second receivers in order to eliminate a portion of the noise component.

6. A method of reducing noise during communication of data from a sensor located in a wellbore, comprising:
    transmitting the data from the sensor;
    measuring the data in the form of a first signal from a first location;
    measuring the data in the form of a second signal from a second location;
    measuring the data in the form of a third signal from a third location proximate the wellbore;
    summing at the first signal and the second signal, and thereby determining a noise from a rotating tubular; and
    reducing the noise in the transmitted data.

7. The method of claim 6, wherein the third signal comprises a magnetic signal.

8. The method of claim 6, wherein the first location and the second location are equidistant from the wellbore.

9. The method of claim 8, wherein the first location is about 180 degrees from the second location with respect to the wellbore.

10. The method of claim 6, wherein the data comprises an electromagnetic wave.

11. The method of claim 6, wherein the sum of the first signal and the second signal is summed with the third signal.

12. The method of claim 6, wherein reducing the noise comprises removing an electromagnetic noise from the electromagnetic wave.

13. A method of forming a wellbore, comprising:
    providing a drill string having a drill bit;
    rotating the drill bit to form the wellbore;
    measuring a parameter associated with drilling;

transmitting the measured parameter in the form of an electromagnetic wave;
measuring a first signal and a second signal away from the wellbore;
summing the first signal and the second signal to determine a noise signal;
measuring a third signal proximate the wellbore;
removing the noise signal from the third signal to obtain a noise reduced electromagnetic signal;
determining the measured parameter from the noise reduced electromagnetic signal; and
extending the wellbore in response to the measured parameters.

14. The method of claim 13, wherein the parameter associated with drilling is selected from the group consisting of downhole pressure, weight on the drill bit, directional orientation, earth formation properties, and combinations thereof.

15. A method for determining a noise signal in a wellbore telemetry system, comprising:
measuring a first signal from a first location away from the wellbore;
measuring a second signal from a second location away from the wellbore;
reconciling the first signal with the second signal in order to obtain two substantially opposite phased electromagnetic noise components;
summing the first signal and second signal to determine a noise signal; and
using the noise signal to determine a wellbore parameter.

16. The method of claim 13, further comprising transmitting the first signal and the second signal through a low noise cable.

17. The method of claim 13, wherein the first and second signals are measured at a distance of greater than fifty meters from the wellbore.

18. The method of claim 17, wherein the first signal and the second signal are measured at locations on opposite sides of the wellbore.

19. The method of claim 13, wherein the third signal comprises a magnetic signal.

20. The method of claim 13, further reconciling the first signal with the second signal.

21. The method of claim 20, wherein reconciling the first signal with the second signal comprises adjusting the angular disparity, the distance disparity, or combinations thereof.

22. The method of claim 20, wherein reconciling the first signal and the second signal results in the first signal having a phase that is opposite of the second signal.

23. The method of claim 13, further comprising rotating the drill string and measuring a magnetic signal of the drill string.

24. The method of claim 13, further comprising adjusting the measured magnetic signal to reduce the electromagnetic noise in the electromagnetic wave.

25. The method of claim 24, wherein adjusting the measured magnetic signal comprises adjusting an amplitude of the measured magnetic signal.

26. The method of claim 25, further comprising adjusting a phase of the measured magnetic signal.

27. The method of claim 25, wherein adjusting the measured magnetic signal comprises adjusting a phase of the measured magnetic signal.

28. The method of claim 13, further comprising at least partially disposing a first surface antenna and a second surface antenna in the earth to measure the first signal and the second signal, respectively.

29. The method of claim 28, wherein the first surface antenna is about 180 degrees from the second surface antenna with respect to the wellbore.

30. The method of claim 28, wherein the first surface antenna and the second surface antenna are equidistant from the wellbore.

31. The method of claim 13, wherein proximate the wellbore comprises a location within the wellbore.

32. A method for reducing a noise signal in a wellbore telemetry system, comprising:
measuring a first signal from a first location at a first distance from the wellbore, wherein the first signal contains a first electromagnetic noise component;
measuring a second signal from a second location at a second distance from the wellbore, wherein the second signal contains a second electromagnetic noise component;
reconciling the first signal with the second signal such that the first electromagnetic noise component and the second electromagnetic noise component have substantially opposite phases;
summing the first signal and second signal in order to substantially eliminate the first and second electromagnetic noise components; determining an electromagnetic noise signal;
measuring a third signal;
creating an electromagnetic noise reduced signal by removing the electromagnetic noise signal from the third signal; and
determining a downhole condition using the electromagnetic noise reduced signal.

33. The method of claim 32, wherein the electromagnetic noise reduced signal has substantially the original frequency of a source of the first, second and third signals.

34. The method of claim 32, wherein the telemetry system transmits information in the form of an electromagnetic wave.

35. The method of claim 32, further comprising transmitting the first signal and the second signal through a low noise cable.

36. The method of claim 32, wherein removing the electromagnetic noise signal comprises calculating a potential difference between the third signal and the electromagnetic noise signal.

37. The method of claim 32, wherein the first location and the second location are at opposite sides of the wellbore.

38. The method of claim 32, wherein measuring the third signal comprises measuring the third signal at a location proximate the wellbore.

39. The method of claim 38, wherein proximate the wellbore comprises a location within the wellbore.

40. The method of claim 32, wherein reconciling the first signal with the second signal comprises adjusting the angular disparity and the distance disparity.

41. The method of claim 32, wherein the first and second electromagnetic noise components are created by a rotating drill string.

42. The method of claim 37, further comprising wherein the first distance and the second distance are substantially equal.

43. The method of claim 42, wherein the first distance and the second distance are larger than fifty meters.

44. A telemetry system for wireless communication of data from a sensor in a wellbore, comprising:

a transmitter disposed proximate the sensor for transmitting the data;
a first receiver located at a distance away from the wellbore and configured to receive the data transmitted from the transmitter;
a second receiver located at substantially the same distance from the wellbore and on an opposite side of the wellbore and configured to receive the data transmitted from the transmitter, wherein the data from the first receiver and the data from the second receiver each contain an electromagnetic noise component from a rotating tubular; and
a processor adapted to receive and process the data from the first and second receiver in order to calculate a condition in the wellbore.

45. The telemetry system of claim 44, further comprising a third receiver located adjacent the wellbore.

46. The telemetry system of claim 44, further comprising an electronic circuit adapted to remove the electromagnetic noise component from the data.

47. The telemetry system of claim 44, wherein the first and second receivers comprise a surface antenna at least partially disposed in the earth.

48. The telemetry system of claim 44, wherein the electromagnetic noise components of each receiver has a substantially opposite phase due to the receivers location on opposite sides of the wellbore.

* * * * *